United States Patent [19]

Oxenreider

[11] 4,053,686

[45] Oct. 11, 1977

[54] EPOXY SEALED LEAD BATTERY PROBE

[75] Inventor: Terry Russel Oxenreider, Wernersville, Pa.

[73] Assignee: General Battery Corporation, Reading, Pa.

[21] Appl. No.: 722,567

[22] Filed: Sept. 13, 1976

Related U.S. Application Data

[63] Continuation of Ser. No. 593,000, July 3, 1975, Pat. No. 4,010,537.

[51] Int. Cl.$^2$ ............................................ H01M 10/48
[52] U.S. Cl. ....................................... 429/91; 429/184
[58] Field of Search ........................ 429/90, 91, 92, 93, 429/178, 184

[56] References Cited

FOREIGN PATENT DOCUMENTS

| 621,249 | 5/1927 | France | 429/93 |
| 2,130,073 | 3/1971 | France | 429/178 |
| 1,398,387 | 6/1975 | United Kingdom | 429/91 |
| 234,788 | 4/1925 | United Kingdom | 429/93 |

Primary Examiner—Donald L. Walton
Attorney, Agent, or Firm—Benasutti Associates, Ltd.

[57] ABSTRACT

An electric storage battery is disclosed having a case to retain electrolyte up to a given preferred level, cover means for retaining the electrolyte within the case, said cover means having defined therein at least one bore, said bore comprising at least one constricted section, probe means for sensing the preferred level of the electrolyte, said probe means being disposed through the cover, and resin means for chemically sealing at least a portion of said probe means with said cover means. In addition to the above, the present application discloses an inter-relationship between the remainder of the probe and the bore which allows for the introduction of resin between the surfaces of the probe and bore to create an effective seal between the probe and battery cover. Finally, a unique configuration of probe and bore is disclosed which produces a strong electrolyte tight seal between the probe and battery cover.

4 Claims, 3 Drawing Figures

EPOXY SEALED LEAD BATTERY PROBE

This is a continuation of application Ser. No. 593,000, filed July 3, 1975, now U.S. Pat. No. 4,010,537.

BACKGROUND OF THE INVENTION

The present invention relates to electric storage batteries comprising means for sensing the presence of electrolyte at a given preferred level, and more particularly to electric storage batteries having those sensing means disposed through the battery cover.

It has for many years been known that it is possible to sense the electrolyte level within an electric storage battery by electric means by disposing a probe through one of the walls of the battery so that it might contact the electrolyte within the battery when that electrolyte is at a preferred fill level or within a range of preferred fill levels. Generally, these battery testers or battery probes have been disposed through battery caps which are either inserted in pre-existing fill holes or threaded into holes which are specifically defined in the battery cover for this purpose. U.S. Pats. Nos. 1,453,602, 1,607,031, 2,056,578, 2,056,384, 2,148,657, 2,836,808, 3,314,060 and 3,653,017, all disclose battery electrolyte indicators which are disposed through caps on the top of the storage battery in which the electrolyte level is to be indicated.

More recently, a battery probe has been developed which is not threaded, but instead is forced into a recessed well defined in the battery cover. This well, which is substantially cylindrical, has defined at the bottom thereof an offset opening which is adapted to be pierced by a portion of the probe adapted to sense the electrolyte level. The probe itself comprises a cylindrical lead plug which has crimped to it a tin coated copper pin. The lower portion of the copper pin and the upper portion of the lead plug are molded in a plastic cylinder which allows the lead plug to protrude therefrom for a distance of approximately ⅛ of an inch. The upper portion of the pin is surrounded by a tubular plastic portion which is integral with and slightly offset from the axis of the cylindrical plastic portion described above. This tubular portion completely surrounds the upper portion of the pin and has defined on the outer surfaces thereof a plurality of annular projections. The uppermost surface of the tubular portion terminates in a flange having a larger diameter than the annular projections described above. When this prior art probe is inserted into the well described above, the offset cylindrical lead slug containing portion of the probe pierces the hole defined in the bottom of the well while the annular projections along the tubular portion of the probe form a tight mechanical seal with the sides of the well. The annular flange at the top of the probe engages the upper surface of the battery cover around the well, and prevents the probe from being inserted too far into the well. As a result, this prior art device countersinks the probe within a well formed in the battery cover, making a tight mechanical seal between a plurality of annular projections on the probe, and the walls of the battery cover.

Although providing certain savings in materials and workmanship, use of a battery probe of the type described above has given rise to certain difficulties. In particular, the fixed attachment of a sensing wire to the pin makes the entire probe assembly prone to being loosened or dislodged from its tight engagement with the battery cover. Since the seal which is formed is essentially a tight press fit, the vibration to which a storage battery is normally subjected may tend to dislodge the battery probe from the well resulting in undesired acid leakage from the battery. Alternatively, in the event that the battery cell directly below the probe is not properly vented, acid electrolyte may be pumped or otherwise may seep from the cell, again be seeping around the edges of the battery probe.

SUMMARY OF THE INVENTION

The present invention provides a simple two piece probe which is precast prior to being inserted into a bore which is formed in a battery cover. Instead of relying upon a crimped connection between the lead members and the pin, the battery probe of the present invention casts the tin plated copper pin directly in lead. Unlike prior art devices, the probe of the present invention relies upon a chemically formed resin seal between the battery probe and battery cover, said seal being formed as a result of the novel configurations of the battery probe and the bore into which the probe is to be inserted. In particular, the bore which is formed in the battery cover of the present invention has at least one constricted section, and the probe, which is adapted to pass therethrough is of a dimension which is enough smaller than the bore diameter so as to allow the introduction of a resin between the surfaces of the bore and the surfaces of the probe. This clearance between the bore and the probe is provided along the entire length of that portion of the probe disposed within the bore, with the exception of a flange on the outermost tip of the probe which forms a mechanical seal with at least a portion of the outer section of the bore. The purpose of this mechanical seal is primarily to locate the probe with respect to the bore prior to the introduction of resin between the probe and the bore, ssaid resin being introduced from the opposite side of the probe from the flange so that together the probe and the bore form a liquid-tight receptacle for the liquid resin, which will later set and cure, thereby forming an extremely effective chemical seal between the probe and cover.

In particular, the present invention provides a storage battery having a probe means disposed through a bore in the battery cover and having resin means for chemically sealing said probe to said cover disposed between at least a portion of said probe and said bore. By providing a bore having at least one constricted section along the axis thereof, an hourglass-like interlocking resin configuration is provided which ensures a strong and liquid-tight seal. The upper portion of this hourglass-like configuration is formed between a generally tapered head portion of the probe and a substantially cylindrical outer portion of the bore. The neck of this hourglass configuration is disposed between the constricted section of the bore and the mid portion of the probe, while the bottom portion of the hourglass configuration is formed between a beveled section of the bore and a second ribbed and grooved base portion of the probe.

In addition to providing a strong interlocking seal, the beveled section of the bore and the configuration of the battery probe base portion and terminal portion are adapted to serve as a funnel for resin which is applied to the underside of the cover probe assembly after the probe has been fitted into the bore. Since the battery cover and probe are inverted at the time of introduction of the resin, the mechanical seal which is formed between the battery probe flange and outer section of the bore act to retain the resin between the surfaces of the probe disposed within the bore and the bore itself.

It is therefore the primary object of the present invention to form a strong electrolyte tight seal between a battery cover and a probe disposed therethrough. This and other objects of the present invention will become apparent from the following description.

DESCRIPTION OF THE DRAWINGS

Figure 1:
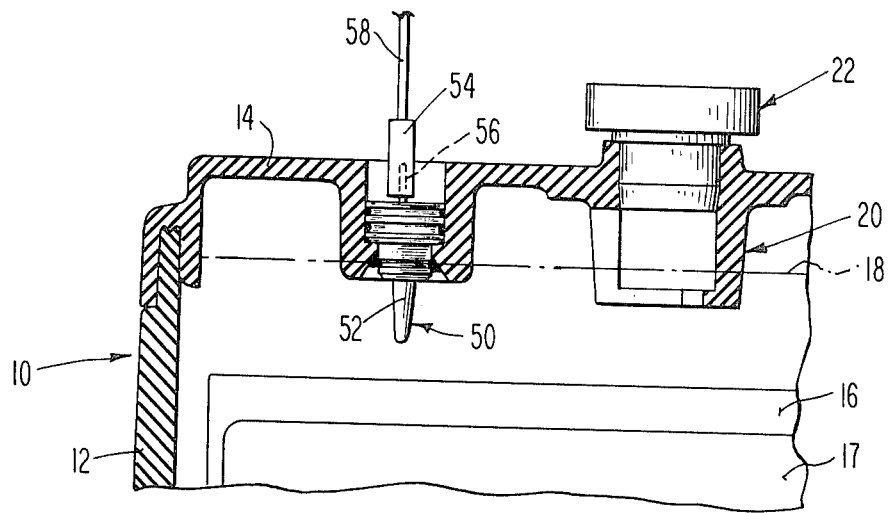
FIG. 1 is a cut away view of one of the cells of an electric storage battery showing a portion of the battery case and cover into which has been sealed a battery probe in accordance with the present invention.

FIG. 1 is a cross section of a portion of an electric storage battery designated generally 10 showing a portion of the battery case 12 engaging a portion of the battery cover 14. This cross section is taken through a cell of the electric storage battery in which the level of the electrolyte is to be sensed. This electrolyte level should preferably cover the plates 17 and separators 16, leaving a sufficient amount of electrolyte above the plates and separators so that the battery will function effectively. For the electric storage battery shown in FIG. 1, the preferred level of electrolyte would be between the top of the plates 17 and separators 16 and the undersurface of the battery cover, and more particularly would be within a range approximately midway between those surfaces, as shown in phantom in FIG. 1, which is intended to represent a preferred level of electrolyte, which phantom line is designated 18. As in the cells of most batteries which are currently sold, the cell shown in FIG. 1 is provided with a fill hole designated generally 20 and a cap for that fill hole designated generally 22. The purpose of this fill hole and cap is to allow for the introduction of battery electrolyte and to provide for venting the battery gases during the overcharging of the battery.

As can be seen in FIG. 1, the battery probe of the present invention, designated generally 50, pierces the battery cover 14 in order to bring a terminal portion 52 of the probe into contact with the battery electrolyte. A clip 54 is attached to a pin 56 of the battery probe of the present invention and in turn makes electrical connection with a sensing wire 58 which leads to sensing circuitry which provides an indication of whether or not the probe is in contact with the battery electolyte. As can be seen in FIG. 1, when the preferred level of electrolyte 18 drops below the terminal portion 52 of the probe, electrical contact between the electrolyte and the probe is broken, thereby giving an indication that more electrolyte is needed.

Figure 2:
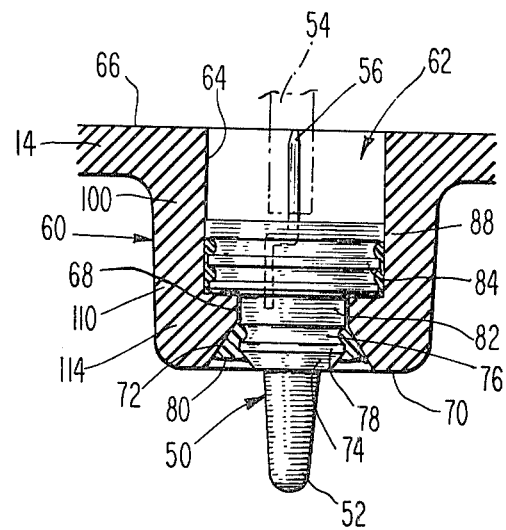
FIG. 2 is an enlarged partial cross section of the probe and a cut away portion of the battery cover.

Referring to FIG. 2, it may be seen that the probe of the present invention designated generally 50 is disposed within the battery cover in a well-like configuration which is formed by a substantially annular boss 60 which increases the effect of thickness of the battery cover. The battery cover 14 and this substantially annular boss 60 may be composed of rubber, polystyrene, polypropylene or any other material normally used in the construction of storage batteries. It should be noted that when polystyrene or polypropylene are utilized in the construction of the battery cover and/or boss it may be necessary to treat the surfaces thereof in order to remove excess oils which might interfere with the bonding capacity of the resin to be used in fastening the battery probe to the cover. In particular, a flaming operation or other method of removing these oils should prove effective in enabling the user to obtain a seal of equal quality in polypropylene or polystyrene as that otherwise obtainable in a rubber cover.

As may be seen in FIG. 2, the battery cover 14 and boss 60 are molded so as to form a bore designated generally 62 therethrough. This bore, designated generally 62, may, for convenience, be described as having three sections. A first outer section 64 is a substantially cylindrical bore which is contiguous with the outer surface 66 of the battery cover 14. The outer section 64 adjoins a constricted section 68 of the bore which is also substantially cylindrical but is of a lesser diameter than the outer section 64 of the bore. Disposed between the constricted section 68 and the inner surface 70 of the boss designated generally 60 is disposed a beveled section 72 of the bore designated generally 62. The specific functions of these sections of the bore will be more fully described hereinafter.

The particular configuartion of the probe, designated generally 50, may also be seen from FIG. 2. The terminal portion 52 which generally contacts the electrolyte is shown to be of a slight taper with a rounded point. Connected to the terminal portion is a base portion 74 which is disposed within the beveled section 72 of the bore designated generally 62. This base portion has as part thereof at least one annular groove 76 and at least one annular projection 78 disposed thereon. This groove 76 and annular projection 78 aid in anchoring the probe, designated generally 50, in place and in combination with the resin, designated generally 80, which will be described more fully hereinafter. Adjacent to the base portion 74 of the probe is the mid portion 82 which is disposed between the constricted section 68 of the bore designated generally 62. The mid portion 82 of the probe, designated generally 50, is substantially cylindrical, having a diameter which is slightly less than the diameter of the constricted section 68. As seen in FIG. 2, the mid portion 82 has a smaller diameter than the head portion 84 and the flange portion 88 of the probe designated generally 50. Conversely, the constricted section 68 of the bore designated generally 62 has the smallest diameter of any of the sections of the bore. The head portion 84 of the probe designated generally 50 is slightly tapered, having a diameter at its junction with the mid portion 82 which is nonetheless substantially larger than the diameter of the constricted section 68 of the bore. The largest diameter of the head portion 84 is nonetheless slightly less than the diameter of the outer section 64 of the bore, thereby facilitating the deposition of resin designated generally 80 between the head portion 84 and the surfaces of the outer section 64. Contiguous with the head portion 84 of the probe and also disposed within the outer section 64 of the bore is the flange portion 88 of the probe which forms the upper surface of the probe. Unlike the head portion 84, the mid portion 82 and the base portion 78, which are all of lesser diameter than their adjacent sections of the bore, the flange portion 88 of the probe forms a mechanical, liquid-tight seal between the probe designated generally 50 and the inner surfaces of the annular boss 50, i.e., the surfaces of the bore, designated generally 62.

The probe, designated generally 50, is cast from lead or lead alloys as commonly used in the battery industry. The pin 56 of the probe of the present invention is composed of a tin plated copper element which is cast directly into the probe at the time the probe is formed. The pin may be bent prior to this casting process in the configuration as shown in the drawings in order to aid in firmly anchoring the pin in the lead portion of the probe. The clip 54 is shown in FIG. 2 is phantom engaging the pin 56.

Figure 3:
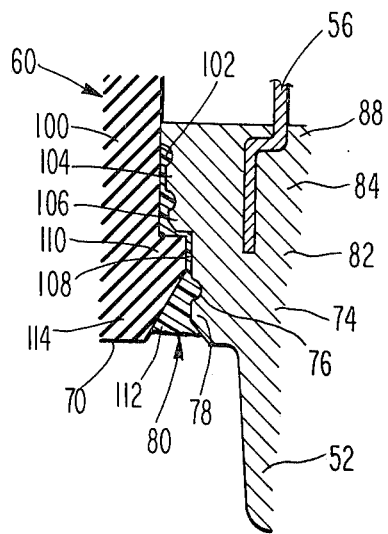
FIG. 3 is an enlarged cross section of a portion of the probe and battery cover of the present invention showing the resin of the present invention disposed therebetween.

Referring now to FIG. 3 which is an enlarged cross section of a portion of the annular boss 60, the probe designated generally 50 and the resin designated generally 80, shown in FIG. 2, the inter-relationship and seal between the probe designated generally 50 and the bore defined in the battery cover 14 may now clearly be seen. As in FIG. 2, the outer section of the bore 62 may be seen as defined by the outer section 100 of the annular boss 60. Disposed within the outer section 64 of the bore 62, which is formed by the outer section 100 of the annular boss 60, are the head and flange portions 84 and 88 respectively. An outer resin wedge 102 may clearly be seen disposed between the head portion 84 and the outer section 100. This resin wedge 102 may be seen to be configured to the first and second ribs 104 and 106 which are formed in the head portion 84 of the probe. These first and second ribs may be seen to taper slightly towards the mid portion 82 of the probe.

A thin film of resin 108 may be seen to be disposed between the mid portion 82 of the probe and the constricted section 110 of the annular boss 60, which constricted section 11 corresponds to the constricted section 68 of the bore designated generally 62 in FIG. 2. Finally, a key 112 of resin designated generally 80 may be seen to be disposed between the beveled section 114 of the annular boss designated generally 60 and the base portion 74 of the probe. This key 112 may be seen to be configured to the groove 76 and the annular projection 78 of the base portion 74, as herein described. The terminal portion 52 may be seen to extend beyond the inner surface 70 of the annular boss, designated generally 60, so as to contact whatever electrolyte may be present.

An electric storage battery incorporating the probe configuration of the present invention would be constructed by firmly sealing the battery cover 14 to the probe designated generally 50 prior to or simultaneous with the installation of the battery cover 14 to the case 12. If the latter operation is also performed using a resin seal between the case 12 and the cover 14, it will presently be seen that very little extra effort is neccesary in order to produce an effective seal between the battery probe 50 and the battery cover 14. In particular, the first step in the assembly operation is to slide a fully formed probe into the bore designated generally 62 which is formed by the annular boss, generally designated 50. Due to the construction of the flange 88, experience has shown that the probe, designated generally 50, will be held in approximately the position shown in FIG. 3, i.e., the probe will be stopped by cast flash and the interference between the head portion of the probe and the constricted section 110 of the annular boss 60, however the fit between the flange portion 88 and the annular boss 60 will not be so tight so as to prevent the subsequent seepage of resin designated generally 80 between the head portion and the outer section 100 to form the resin wedge 102. Once the probe has been inserted into the battery cover from the top side of the cover, the cover may then be inverted so that the terminal portion 52 points generally in the upward direction. In this position, epoxy or other suitable sealing resins may be applied to the undersurfaces of the cover, an operation which is necessary if epoxy or other resins are to be used in sealing the battery cover to the battery case. The beveled sections 72 and 114 may be seen to form with the base portion 74 of the probe a funnel-like reservoir for the resin which is introduced therein having a maple syrup consistency. Due to the configuration of the probe and the bore as described above, upon application, the resin designated generally 80 quickly penetrates the interstices between the probe and bore. The flange portion 88 of the probe, however, effectively prevents the resin designated generally 80 from running out of the upper section of the bore thereby preserving the appearance of the visible portions of the outer section 64 of the bore and the outer surface 66 of the battery cover 14.

Preferably, after the introduction of resin, the resin should be cured, either for several minutes in a drying oven or for a more extended length of time under normal atmospheric temperatures. In order to achieve the best possible seal between the cover and the probe, it is recommended that the cover be kept in an inverted position at least until the resin has set.

As may be seen from the above description, the present invention provides a simple, reliable and inexpensive means for producing an electric storage battery having an extremely strong and liquid-tight battery probe sealed in the cover thereof.

Although specific forms of the invention have been selected for illustration in the drawings, and the preceding description is drawn in specific terms for the purpose of describing these forms of the invention, this description is not intended to limit the scope of the invention which is defined in the appended claims. It will be understood that various changes in the details, materials and arrangement of parts which have been described and illustrated in order to explain the nature of this invention, may be made by those skilled in the art within the principle and scope of the invention as expressed in the appended claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

I claim:

1. An electric storage battery comprising:
   a. a case to retain electrolyte up to a preferred level;
   b. a cover means for retaining said electrolyte within said case, said cover means further having defined therein at least one bore; and
   c. a probe means for sensing said preferred level of electrolyte, said probe means being disposed within said bore, said probe means comprising:
      i. a pin; and
      ii. a lead body comprising a plurality of substantially concentric annular projections of decreasing diameters.

2. The invention of claim 1 wherein said lead body further comprises a head portion located within said bore between a constricted portion of said bore and the top surface of said cover, said head portion having formed thereon a plurality of said annular projections, one of which projections sealingly engages the interior surface of said bore.

3. The invention of claim 2 wherein said body further comprises a base portion, said base portion having at least one annular projection thereon of a diameter less than the diameter of said projections on said portion.

4. The invention of claim 3 wherein only one of said annular projections forms a seal with said bore, the remainder of said annular projections being spaced away from the interior surfaces of said bore; said battery further comprising resin disposed at least between said remainder of said annular projections and between said projections and the interior surface of said bore.

* * * * *